United States Patent
Hohmann

(10) Patent No.: US 10,190,005 B2
(45) Date of Patent: Jan. 29, 2019

(54) PAINTS, LACQUERS OR OTHER COATING MATERIALS WITH ANTI-PINHOLE ADDITIVE AND THE MANUFACTURE AND USE THEREOF

(71) Applicant: Hemmelrath Technologies GmbH, Erlenbach a. Main (DE)

(72) Inventor: Ralf Hohmann, Großheubach (DE)

(73) Assignee: Hemmelrath Technologies GmbH, Erlenbach am Main (DE)

( * ) Notice: Subject to any disclaimer, the term of this patent is extended or adjusted under 35 U.S.C. 154(b) by 0 days.

(21) Appl. No.: 15/116,264

(22) PCT Filed: Feb. 3, 2014

(86) PCT No.: PCT/DE2014/100030
§ 371 (c)(1),
(2) Date: Aug. 3, 2016

(87) PCT Pub. No.: WO2015/113530
PCT Pub. Date: Aug. 6, 2015

(65) Prior Publication Data
US 2017/0009087 A1 Jan. 12, 2017

(51) Int. Cl.
*C08K 3/36* (2006.01)
*C09D 7/80* (2018.01)
*C09D 7/47* (2018.01)

(52) U.S. Cl.
CPC ............... *C09D 7/80* (2018.01); *C09D 7/47* (2018.01); *C08K 3/36* (2013.01); *C08K 2201/005* (2013.01); *C08K 2201/006* (2013.01)

(58) Field of Classification Search
None
See application file for complete search history.

(56) References Cited

U.S. PATENT DOCUMENTS

| | | | | |
|---|---|---|---|---|
| 4,416,941 A * | 11/1983 | Barsotti | ............... | C09D 133/06 428/328 |
| 4,920,162 A | 4/1990 | Clark et al. | | |
| 5,204,088 A * | 4/1993 | Noebel | ............... | A61K 8/046 424/401 |
| 2004/0158022 A1* | 8/2004 | Baumgart | ............... | C08G 18/2865 528/68 |
| 2007/0017567 A1* | 1/2007 | Gronet | ............... | H01L 31/02167 136/246 |
| 2008/0220255 A1* | 9/2008 | Chen | ............... | C01F 11/185 428/404 |

FOREIGN PATENT DOCUMENTS

| | | |
|---|---|---|
| DE | 36 15 181 A1 | 2/1987 |
| DE | 43 03 787 C1 | 3/1994 |
| DE | 689 25 826 T2 | 9/1996 |

OTHER PUBLICATIONS

International Search Report and Written Opinion for International Application No. PCT/DE2014/100030, dated Sep. 25, 2014, 10 pages.
J. Falbe, M. Regitz: excerpt from "Römpp Chemie Lexikon", ISBN: 3-13-102759-2, Stuttgart; 1995, 3 pages.

* cited by examiner

*Primary Examiner* — Melvin C. Mayes
*Assistant Examiner* — Colette B Nguyen
(74) *Attorney, Agent, or Firm* — Westman, Champlin & Koehler, P.A.

(57) ABSTRACT

The invention relates to paints, lacquers or other coating agents in solution consisting of binding agents, pigments, solvents, fillers and additives, said additives at least partially counteracting the formation of pin-holes and the anti-pinhole additive being hydrophilic fumed silica. The invention also relates to the production and use of the additive.

2 Claims, No Drawings

PAINTS, LACQUERS OR OTHER COATING MATERIALS WITH ANTI-PINHOLE ADDITIVE AND THE MANUFACTURE AND USE THEREOF

CROSS-REFERENCE TO RELATED APPLICATION

This Application is a Section 371 National Stage Application of International Application No. PCT/DE2014/100030, filed 3 Feb. 2014 and published as WO 2015/113530 A1 on 6 Aug. 2015, in German, the contents of which are hereby incorporated by reference in their entirety.

BACKGROUND

The invention relates to paints, lacquers or other coating materials in liquid solution, consisting of binders, pigments, solvents, fillers and additives, the additives at least partly acting against pinhole formation, and the manufacture and use thereof.

The term "silica" is a generic designation for compounds of the general formula $SiO_2 \cdot nH_2O$, where n is a natural number which indicates the number of chemically bound $H_2O$ molecules It should be made clear that this is not water of crystallinity, so that the elimination of $H_2O$ may only take place by means of chemical reactions. A subset of this is formed by pyrogenic silicas, which are produced by flame hydrolysis, that is to say pyrogenic methods, in the manner that silicon tetrachloride is decomposed in an oxyhydrogen flame. Because of the high temperatures and the gas phase, coagulation of the monomeric silicas takes place. In the case of pyrogenic silicas, they are highly disperse silicas, which possess an almost entirely non-porous surface and in comparison to precipitated silcas, have significantly fewer OH groups on the surface. Their hydrophilicity is caused by the silanol groups. By corresponding post-treatment processes, a reaction of the OH groups can take place, so that, as a result, pyrogenic silica with hydrophobic, that is to say water-repellent, surfaces is produced. According to the literature (Römpp-Chemielexikon Thieme-Verlag), under the head word "silica", as uses, there are quoted reinforcing fillers for rubber, carriers for plant protection agents, in silicone oil and mineral oil defoaming agents, in joint sealing compounds, as free-flow aids, for matting of lacquers, as antiblocking agents in plastics and as toothpaste additives.

One of the faults frequently occurring during the application of lacquers and paints is the occurrence of pinholes, wherein, in the context of the present invention, this term is to be widely interpreted and all kinds of surface defects, be they circular or non-round, comparatively shallow in the manner of a dent or depressions, which may extend as far as the substrate of the lacquer film and may occur individually or frequently. One of the most frequent causes of the occurrence of pinholes is the incidence of substances with low surface tension on the not-yet-hardened lacquer film or due to the spontaneous local release of volatile components in a late phase of crosslinking, at a point in time in which the viscosity is already relatively high and the film can thus not completely flow. The formation of pinholes can also occur if one or more lacquer components has a significantly higher surface tension than the rest of the coating. To counteract the formation of pinholes, additives are available which essentially lower the surface tension of the lacquer by accumulating at the surface, with which a control of the viscosity of the lacquer is achieved and wetting agents and solvents with low surface tension are used. It remains to be made clear that other causes that lead to the formation of pinholes may also be present, which may be identified in the unclean pretreatment of the workpiece surface because of residual contamination and foreign materials, but also in the contamination of individual lacquer components. These causes can be effected by an improvement of the cleanliness of lacquer production and/or a correspondingly good pretreatment of the workpiece during painting.

As additives, auxiliary materials or additives are quoted, which are added to the lacquers and paints in small amounts to achieve or improve particular properties. Since the quantity proportion of the additive in the overall formulation is very low, its proportion is usually less than 1 percent of the total formulation. Irrespective of the low quantity proportion, the costs of the additives are often very high, which is caused by the fact that the industrial manufacture of the additives is cost intensive because of the low production quantity.

The surface defects occurring during the production and manufacture of coatings and lacquers, such as pinhole formation, require, after their occurrence, complicated secondary work in order to achieve a smooth surface of the subsequent coats. These measures make continuous production difficult, so that it is necessary to avoid pinhole formation, so that because of the many possible causes, the solution is sought in avoiding pinhole formation by the addition of additives. It is also known, for example from German patent DE 43 03 787, that, after the application of a coating in an electrocoating bath, before the further work steps, the workpiece is removed from the bath and treated with corresponding solutions, for example polyvinyl alcohol solutions (DE 43 03 787).

As anti-pinhole additive, chemical compounds are known, which are attributed to the group comprising polyacrylate resins, polyether resins, polyester resins and silicone resins (DE 68925826 T2).

SUMMARY

It is an object of the invention to provide an additive for paints, lacquers and coating materials in liquid phase to avoid pinhole formation, which can be acquired relatively inexpensively on the market. The manufacture and application to the workpiece are also objects of the invention.

DETAILED DESCRIPTION

This object is achieved in that the anti-pinhole additive is a hydrophilic pyrogenic silica.

The principle achievement of the invention consists in the fact that it has been discovered for the first time that a substance that is commercially available and well-known is used for purposes of anti-pinhole formation. From the purposes known from the prior art, there are indications of it acting as an anti-pinhole-formation agent in lacquers and coatings. Another significant invention is that the claimed substance is available more inexpensively compared to other known anti-pinhole agents.

The term "lacquer" is to be very broadly interpreted in the sense of the invention and should comprise lacquers normally designated "paint," which are characterised in that pigment colorants have been added. The "lacquer" used as a generic term in the sense of the invention additionally also comprises those compounds that are free of colour pigments, that is to say clear and/or colourless. Other coating materials are also to be subsumed therein.

The addition of the additive to the paints, lacquers and coating materials is carried out such that the additive is usually dispersed into the lacquer and coating material during the manufacture thereof. Likewise the application of the lacquer according to the invention is carried out such that no special disadvantages and precautionary measures are to be encountered thereby. As a result, the process steps to be taken in the manufacture as well as in the application are identical to those from the prior art, so that no disadvantageous consequences are to be expected.

The additive proposed according to the invention can be used for a wide field of applications. The formulation proposed according to the invention has, as prerequisite for the application thereof, the liquid phase, that is to say the formulation lies in a phase formed by solvent. Thereby, the term "solvent" in the sense of the invention comprises all solvents that are harmless in the application and in particular also water.

In a further expedient embodiment, it is proposed that the mean specific surface area (BET) is 100-300 $m^2/g$. The quoted value range accordingly relates to the mass-related (not the volume-related) specific surface-area and is determined by one of the conventional surface measurement methods. As is known, all chemical reactions depend essentially on how large the target surface area of the reaction partners is in comparison to the volume, so that the internal surface area is highly important as regards the reaction.

It is particularly preferred to use the anti-pinhole additive with a particle size between 5 and 100 nm. Since the reaction properties depend to a considerable extent on the particle size, this value range was recognised as advantageous. A certain relationship to the specific surface area exists, wherein, due to the shape of the individual grain (spherical, fissured surface) deviations can occur.

It was mentioned above that the total quantity of silica can be described by the chemical formula $SiO_2 \cdot nH_2O$, where n is a natural number. $SiO_2$ compounds are thereby described with different proportions of water. From the large number of compounds that result with changing n, the low-order natural n, in particular n from the interval 0 to 2, are predominantly present, because of and determined by the pyrogenic method of manufacture, that is to say the high temperature during the manufacturing process. The silica that is used generally represents a mixture of components of different chemical composition.

For the use of and addition of the proposed anti-pinhole additive to the lacquer recipe, there are fundamentally two different possibilities.

In the first case, the additive is added to the paint formulation during the manufacture, without any relationship to the subsequent application. The additive is thus added prophylactically and is added to all those lacquer formulations in which, in the subsequent application, the formulation of an anti-pinhole additive would not be necessary because of the advantageous and favourable condition and purity of the surface on which the lacquer is subsequently to be applied. From economic points of view, this could be considered as a disadvantage.

In an alternative use, an application and use of the paint formulation without anti-pinhole additives onto the workpiece takes place first, that is to say before the application of the final paint coat, in order thereby to check whether, and to what extent, formation of pinholes can occur. If the quality of the lacquer surface is already satisfactory, the admixture of the additive is not necessary. However, if the test lacquering leads to the result of defective surface quality, a corresponding amount of the anti-pinhole additive is admixed to the lacquer formulation. Only then is the lacquer applied to the workpiece. The advantage of this procedure consists in the fact that the addition takes place when, and only when, the anti-pinhole additive is necessary, which is to be regarded as an advantage from economic points of view. The individual adaptation and adjustment to the specific workpiece by means of a preceding test lacquering means taking into account the pinhole formation, which is generally caused by contamination, in every individual application case. Besides the clarification of the question "addition of the anti-pinhole additive yes/no", the level of the dosage can also be determined, so that in the case of pronounced pinhole formation, a high dosage and in the case of low pinhole formation a corresponding lower amount can be added. The possibility of the individual adaptation to the specific workpiece is set against the effort for performing a test lacquering, which is put into perspective in view of the test lacquering that is already routinely performed, or the test surfaces that are produced thereby.

The weight proportions of the anti-pinhole additive can be ultimately determined by the manner of the specific application, or adjusted thereto, and are of the order of one weight percent.

In the case of the additive according to the formulation, It is a powder that can be added to the lacquer formulation. The introduction into the lacquer formulation, but also the desired dosage, often proves difficult in practice. With direct introduction of the powder, both a wetting and a dispersion of the powder can be carried out before the actual incorporation can take place. The places severe demands and complicates the direct introduction of the powder-form material.

For these reasons, starting from the powder, first a suspension is formed with a pasty consistency, and this paste is only subsequently added to the lacquer formulation. The paste is thus the carrier of the anti-pinhole additive, which from then on solely represents the active substance.

The advantage of the application of the paste consists in the possibility of more accurate dosage and also the possibility of easier incorporation into the lacquer formulation. The advantage of the application of the paste also consists in the fact that the active substance, namely the additive, is already wetted and dispersed and can therefore be more easily introduced into the lacquer.

The use of the additive proposed according to the invention is always appropriate when, due to defects in the surface tension, the formation of pinholes occurs on the workpiece after application. There are a variety of causes for the occurrence and influencing of the surface tension. It is particularly preferred that the lacquer formulation provided with the anti-pinhole additive according to the invention is to be applied when silane or silanol compounds are present on the surface of the workpiece. Particularly this group of compounds is derived from contaminants from the lubricants and greases from the machines used, and the application of the anti-pinhole additive according to the invention has proved particularly effective here. The silane and silanol compounds influence the surface tension in that spreading of the lacquer surface, and thereby formation of a pinhole occurs. It should be made clear that the formation of pinholes can also be triggered by substances of other chemical structures and not necessarily by silane and silanol compounds.

It is fundamental that the lacquer formulations provided with the anti-pinhole additive according to the invention can be used with all kinds of lacquer application processes without restrictions of any art occurring thereby. The paint formulations according to the invention are suitable for one-coat and multi-coat lacquering, but also for electrocoating. The application of the lacquer in the various processes takes place according to the method known from the prior art without the need to take into account special measures attributable to the anti-pinhole additive.

Although the present invention has been described with reference to preferred embodiments, workers skilled in the art will recognize that changes may be made in form and detail without departing from the spirit and scope of the invention.

The invention claimed is:

1. A process for applying a coating, which is in the form of a paint, a lacquer, or another coating material in a liquid solution, to a workpiece in order to obtain a pinhole-free surface, the method comprising:
    providing an anti-pinhole additive comprising hydrophilic pyrogenic silica;
    determining whether the workpiece has been contaminated by silane or silanol compounds;
    adding the anti-pinhole additive to the coating when the workpiece is determined to be contaminated by silane or silanol compounds; and
    applying the coating to the surface of the workpiece.

2. The process according to claim 1, wherein adding the anti-pinhole additive comprises adding a dosage of the anti-pinhole additive based on the determined surface quality.

* * * * *